United States Patent [19]

Shiber

[11] 4,069,881

[45] * Jan. 24, 1978

[54] CONTROL SYSTEM FOR A SKATEBOARD TYPE DEVICE

[75] Inventor: Samuel Shiber, Mundelein, Ill.

[73] Assignee: Saroy Engineering, Wheaton, Ill.

[*] Notice: The portion of the term of this patent subsequent to June 29, 1993, has been disclaimed.

[21] Appl. No.: 683,481

[22] Filed: May 5, 1976

Related U.S. Application Data

[63] Continuation-in-part of Ser. No. 587,342, June 16, 1975, Pat. No. 3,966,010.

[51] Int. Cl.² .............................................. B62M 29/00
[52] U.S. Cl. .............................. 180/1 G; 280/11.11 E; 180/77 H; 60/581; 74/471 R; 138/178
[58] Field of Search ............... 280/11.11 E, 11.11 ET, 280/11.11 R, 87.04 A, 87.04 R; 115/70; 180/1 G, 82 R, 103 R, 103 A; 60/533, 562, 581; 74/482, 470, 471 R, 501 R, 501.5 H; 138/178

[56] References Cited

U.S. PATENT DOCUMENTS

| | | | |
|---|---|---|---|
| 1,694,671 | 12/1928 | Rodelli | 280/11.11 E |
| 2,857,008 | 10/1958 | Pirrello | 280/11.11 E |
| 3,269,276 | 8/1966 | Natanson | 60/533 |
| 3,487,858 | 1/1970 | Hanback | 138/118 |
| 3,513,658 | 5/1970 | Okuma | 60/62.5 |
| 3,742,928 | 7/1973 | Albertson | 180/82 R |
| 3,751,062 | 8/1973 | White | 280/87.04 A |

Primary Examiner—Joseph F. Peters, Jr.
Assistant Examiner—Donn McGiehan
Attorney, Agent, or Firm—Samuel Shiber

[57] ABSTRACT

A hand operated control system for transmitting signals from a user's hand to a running gear of a skateboard type device, comprising of a hand operated master unit, a slave unit connected to the running gear and a resilient self storing tube connecting said units for transmitting signals therein between.

8 Claims, 3 Drawing Figures

U.S. Patent    Jan. 24, 1978    4,069,881
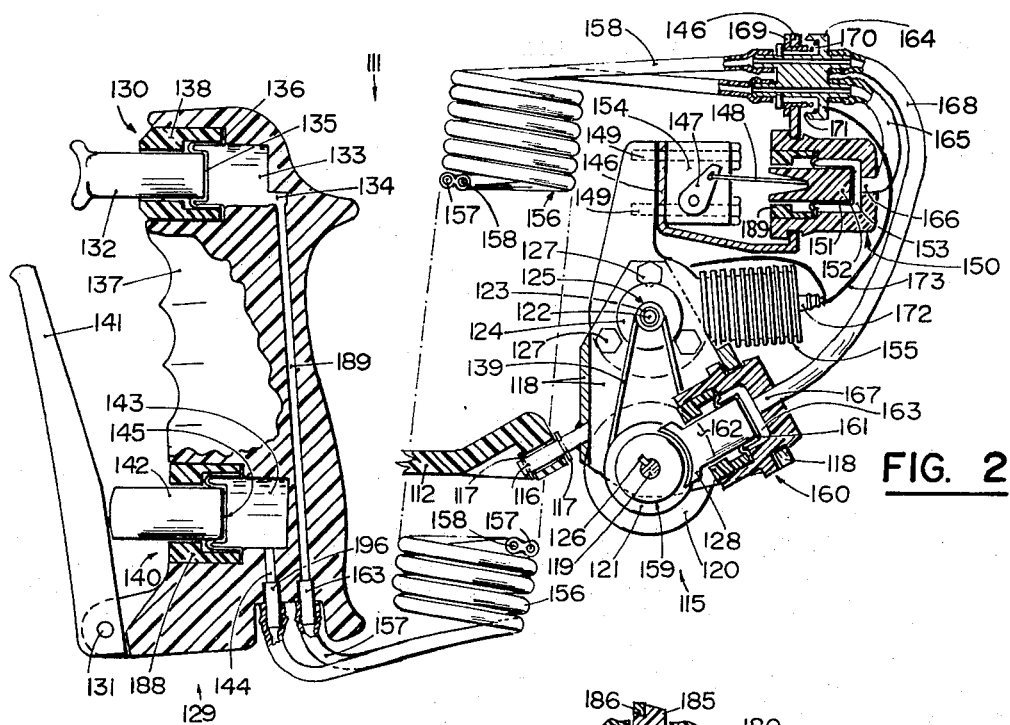
FIG. 2
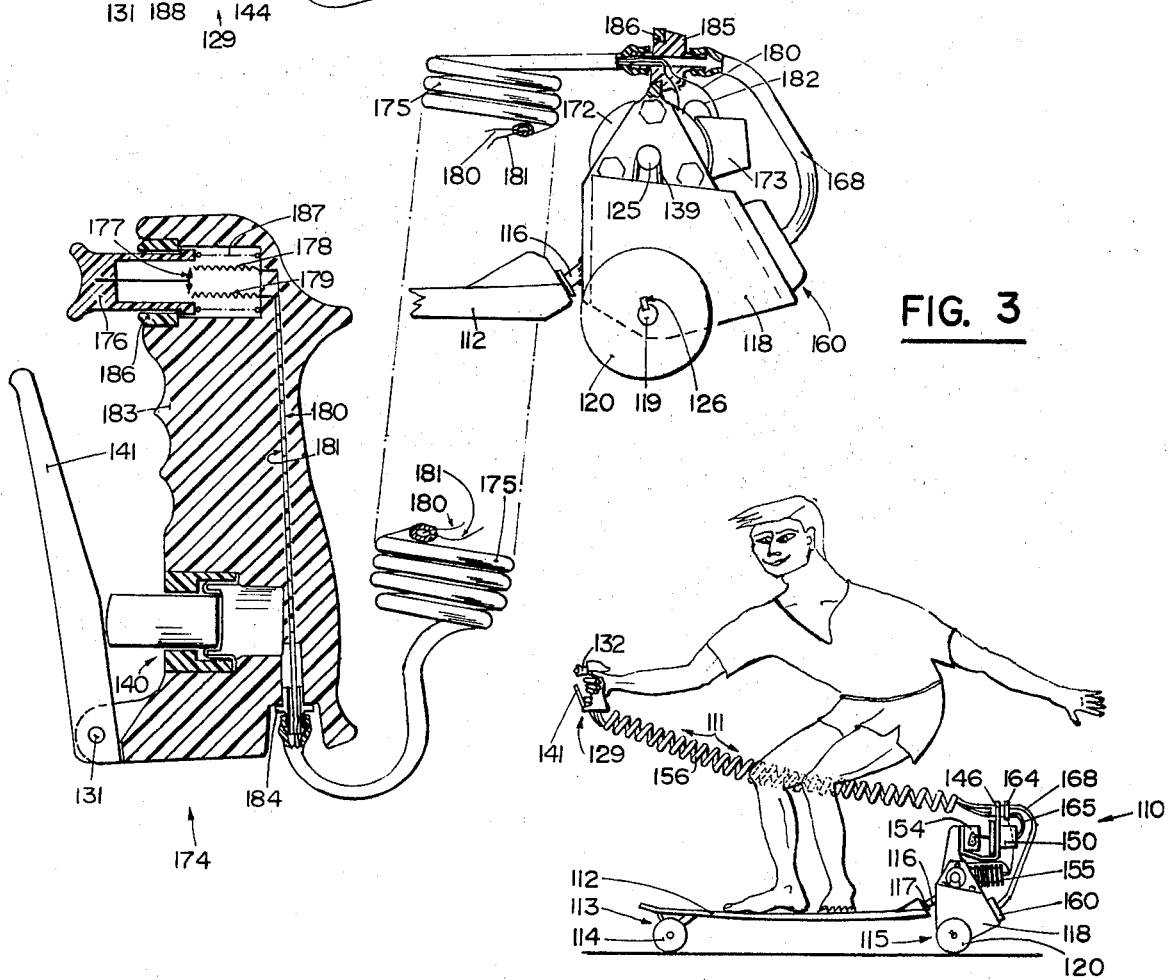
FIG. 3
FIG. 1

CONTROL SYSTEM FOR A SKATEBOARD TYPE DEVICE

BACKGROUND OF THE INVENTION

This application is a continuation-in-part of my co-pending application Ser. No. 587,342 filed on June 16, 1975, now U.S. Pat. No. 3,966,010.

Power-driven devices such as skateboards, skates and surfboards are relatively newcomers to the field of motorized sports. They provide unique and new ways of enjoying the outdoors and they require unique mechanisms to make their usage possible, convenient and as safe as possible. Since these devices pose similar control problems, I will refer to them commonly as "skateboard type device" throughout the specifications and the claims, and will use a skateboard as an example to illustrate the background as well as the embodiments of the present invention.

A power-driven skateboard provides the skater, on one hand, with the challenge of holding balance and steering by body manipulations, without being limited to a "one-way" skating down an inclined surface, and on the other hand, a power-driven skateboard provides the skater with the excitement of controlling his own propelling power, coupled with the freedom to roam up or down hills, and over flat land, without imposing large penalties of costs (purchasing & operating) and transportation.

At the same time, since power-driven skating incorporates the fun of skating and of motorcycling into one sport, it also imposes on the power-skater the "chores" of skating and of controlling the engine of the power-driven skates and brakes, simultaneously.

Controlling the engine power, which in the case of an internal combustion engine, is usually done in the form of varying the carburetor's throttle opening and controlling the brakes, which is usually done by energizing a friction mechanism, poses unique problems.

While skating, the feet are preoccupied and any control functions have to be carried out by the hands. However, the hands are also partially preoccupied, since they are used extensively as "counter weights" which the skater may throw upwards or sideways, to maintain his balance. For example: commonly, when starting to power-skate, the skater may be thrusted forwards by the power-driven skate, and attempt to recover his balance by throwing his hands upwards above his head. In contrast, when climbing a steep hill, the skater may be bending forward, at which position his hands are in the vicinity of his legs and the engine of the power-driven skate. The various positions and actions of the hands lead us back to note some of the unique problems that the throttle brake control has to accomodate; since, as mentioned, it must be hand-operated, it has to follow the hand through all its gyrations and movements, while the skater fights for his balance, and at the same time, the throttle control has to continuously transmit a steady signal to the engine. The throttle control must, therefore, be responsive to the relatively weak signal input, and to transmit this signal accurately and smoothly. (The importance of smooth and accurate throttle control can be visualized in the light of the above discussion, since it affects the smoothness and the accuracy of the forward thrust generated by the power-driven skate, which affects the skater's ability to maintain balance).

In addition, the skater's hand may be either up above his head or at the vicinity of his leg, i.e. it may be as far as ten feet from the engine, or as close as one foot, respectively. It is important that while the hand is near the leg (and at all other times), no part of the throttle control is free to drag on the ground, as it may be damaged by the skateboard, interfere with the skater and cause his loss of balance. Furthermore, the throttle control may be subjected to being sharply bent, twisted, as well as being exposed to outdoors weather, i.e. rain, dust, etc..

SUMMARY OF THE INVENTION

The present invention relates to a throttle, a brake and a shut-off control system, which is particularly suitable for a power-driven skateboard type device.

Briefly, a preferred embodiment of the present invention comprises of a double master cylinder, a first slave cylinder attached to the engine and adapted to affect its throttle opening, a second slave cylinder attached to a wheel brake mechanism for energizing it, and a special twin tube assembly for mechanically and hydraulically connecting the double cylinder to the slave cylinders. In addition, the tube is adapted to carry through itself a shut-off command, mechanically.

The tube is in the form of a self-storing helical extension spring and is therefore made of material which is, on the one hand, resilient enough to allow the extension spring to extend and retract and, on the other hand, a material stiff enough to maintain the cross section area constant enough so that when the tube acts as a spring its internal volume would not change and would not thereby affect the signal which the tube transmits hydraulically at all times from the master cylinder to the slave cylinders.

The master and slave cylinders contain rolling diaphragm mechanisms which allow translation of a mechanical signal into a hydraulic signal at the master cylinders and vice versa at the slave cylinders, very efficiently. In addition, a rolling diaphragm provides hermetic seal and prevents loss of fluid over an extended period of time (in contrast, a sliding piston and seals, as in a regular master cylinder arrangement, tend to develop substantial friction which have stick-slip characteristics and, in addition, tend to allow a certain leakage).

A fluid medium contained in the cylinders and the tube does the actual signal transmission between the cylinders. The fluid should obviously be compatible with the tube, the cylinder and the diaphragm materials and, in addition, it should have a low viscosity.

When the skater does not introduce a mechanical signal into the master cylinders, the throttle control is in its free position, therefore the throttle of the engine's carburetor is closed, and the brake is de-energized. In response to the skater's first signal the first master cylinder displaces fluid through the tube assembly into the first slave cylinder, which in turn opens the throttle and also energizes a return spring whose function is to urge the system into its free position. The return spring force is chosen in proportion to the friction force in the system. When activating the throttle control, the skater has to overcome both the friction-generated forces and the return spring force, whose magnitude also depends on these friction forces. Therefore, it is essential to keep these friction forces to a minimum, since the force that a skater's finger can apply comfortably, over an extended period of time, is limited. That is why the low viscosity of the fluid medium and the usage of rolling diaphragms, which are practically frictionless, are important. Furthermore, experience indicates that there are rather narrow design and dimensional constraints that have to be adapted, especially while designing and constructing the throttle control portion of the first embodiment, in order to achieve good results. For example: the maximum amount of volume to be displaced into the first slave cylinder, in order to change the throttle position from fully closed to fully opened, should be preferably below one cubic inch. Larger volumes will call for a large tube cross section and thus an increase in components' sizes, increasing friction and cumbersomeness. Further, as one may note, the design of the return spring has to take into consideration a case wherein the skater wants to release the throttle control while his hand is above his head, and the return spring has to overcome—in addition to the friction forces—a hydrostatic head of approximately 7 feet. Hence, the larger the signal's volume the larger the return spring has to be, penalizing the skater's finger with higher force requirements. On the opposite end of the scale of parameters' choices, if one over-decreases the size of the signal's volume, he starts noticing that the swelling of the tube under the signal's pressure (and, the smaller the signal's volume is, the higher the pressure) dissipates a large portion of the signal, up to a point of loss of effective signal transmission.

The design of the second master and slave cylinders for energizing the skateboard wheel brake is similar; however, the design considerations are less restrictive, since the second master and slave cylinders are used intermittently and are usually transmitting higher forces than the first master and slave cylinders.

In a second embodiment of the present invention the brake control portion is unchanged, but the throttle control is replaced with a variable electrical resistance which is connected to an electrical circuit (which, in turn, is part of the running gear), through wires which are carried by the hydraulic tube which transmits the signal to the brake.

The engine used to propel the power-driven skateboard is preferably a small internal combustion engine, of the type that is commonly used in chainsaws (for example: an engine currently available on the market delivers over 1 HP, while weighing approximately 6 pounds). Commonly, such engines incorporate an ignition circuitry that energizes a spark plug, and a switch means mounted on the engine to shut-off the engine by disabling the ignition circuit (numerous text books, repair manuals and other publications contain detailed information on the structure and function of small gasoline engines). Now, since while power-skating, a skater may fall (like in regular skating), and may not always easily find—or even physically reach—the shut-off switch mounted on the engine, and in the process of falling (or, in some cases, as a reason for his falling) the throttle may be stuck in a wide open position (due to sticking, or some other mechanical malfunction), it is preferred to provide an alternative means to shut-off the engine at the skater's finger tips access. The present invention shows how this can be done and particularly, how it can be done economically and without adding cumbersomeness, by incorporating an engine shut-off system in the throttle and in the brake control hardware.

The invention will be now illustrated in conjunction with the accompanying drawings.

BRIEF DESCRIPTION OF THE DRAWINGS

FIG. 1 is a side view of a skater on a power-driven skateboard using a first embodiment of the present invention, FIG. 2 is a partially sectioned side view of the first embodiment of the present invention, and FIG. 3 is a partially sectioned side view of a second embodiment of the present invention.

DETAILED DESCRIPTION OF THE DRAWINGS

FIG. 1 illustrates a skater on a power-driven skateboard 110 which incorporates a first embodiment of the present invention 111. The skateboard 110 comprises an elongated board 112 which is supported at one end by a front axle assembly 113 including a pair of free spinning wheels 114 (one shown), and at its other end by a transaxle assembly 115 which is attached to the board 112 by a shaft 116 and snap-rings 117 affixed thereon.

Referring now also to FIG. 2, the transaxle assembly 115 comprises a frame 118 welded to the shaft 116, the frame 118 rotatably supports a drive shaft 119 to which drive wheels 120 (one shown) and a drive sprocket 121 are affixed with keyways 126. The frame 118 also supports an internal combustion engine 155, affixed thereto by three bolts 127, having an output shaft 122 which is coupled through: a one-way clutch 123, a centrifugal clutch 124 and a clutch-sprocket 125, to a roller chain 139 which is coupled to the sprocket 121.

The hand operated control system 111 for accelerating and braking the skateboard 110 is adapted to transmit signals from a skater's hand to a carburetor 154 of the engine 155 and a brake shoe 128, both of which are part of the skateboard's running gear. (The term "running gear" refers to the various mechanical components that comprise the skateboard's drive train, brakes, brackets etc.).

The control unit comprises:

A twin master unit 129 consisting of a first and a second master cylinder assemblies 130 and 140 respectively. The first master cylinder 130 has a trigger-piston 132 which is adapted to move inwards into a cavity 133 in response to a first mechanical input from the skater's finger and cause the first master cylinder 130 to generate a signal in the form of fluid displaced from the cavity 133 through a first output port 134. A rolling diaphragm 135, whose flanged base 136 is clamped between the twin master cylinder body 137 and a sleeve 138, seals hermetically the fluid in the cavity 133. A rolling diaphragm mechanism is a preferred sealing mechanism over sliding seals since it has negligable friction and leakage characteristics. The second master cylinder 140 is slightly larger and its piston 142 is adapted to be pushed into a cavity 143 by a lever 141 which is pivotly connected to the twin master cylinder body 137 by a pin 131. The lever 141 is adapted to accept a mechanical input from several fingers, and transmit it to the piston 142 and a rolling diaphragm 145 which translates it to a signal output in the form of displaced fluid through a second output port 144. A sleeve 188 clamps the rolling diaphragm 145 in position.

A first slave cylinder 150 is connected to the running gear by a bracket 146 which in turn is clamped between the engine 155 and the carburetor 154 by bolts 149 and is adapted for receiving the first signal in a form of incoming fluid, and to effect the carburetor's throat openning by forcing a rolling diaphragm 151 and piston 152 out of a cavity 153, which in turn rotates a swiveling handle 147 through a push rod 148, which opens the carburetor's throat and accelerates the power-driven skateboard. The rolling diaphragm is clamped in place by a sleeve 189. A second slave cylinder 160 is connected to the frame 118 for receiving the second signal output in a form of fluid input, in response to which a rolling diaphragm 161 and piston 162 are forced out of the cavity 163, causing the friction shoe 128 to be energized against a hub 159 of the sprocket 121, causing the braking of the shaft 119 and the wheel 120.

The first and second signals are sent from the twin master cylinders through a self storing, signal transmitting, polyurethane twin tube 156, which is coiled and performs as an extension spring to maintain itself in a route as direct as possible between the skater's hand and the bracket 146. As shown in FIG. 1, the twin tube 156 will route itself around the skater's leg, or any other obstacle, while attempting to maintain as direct a route as possible between the bracket 146 and the hand, therefore it will keep itself snug and out of contact with the ground, the skateboard's wheels etc., where it may be damaged and interfere with the skater's balance and his actions. The twin tube 156 comprises a first tube 157 and a second seperate tube 158. The first tube connects at its one end to the first output port 134 through a passage 189 and a barbed fitting 163, and at its other end to a twin connector 164 which connects it to a first input port 166 of the first slave cylinder 150 through a first short tube section 165. The second tube connects at its one end to a second output port 144 through a barbed fitting 196, and at its other end to the twin connector 164, which connects it to a second input port 167 of the second slave cylinder 160. When the skater stretches the twin tube 156 beyond a certain point, for example by grabbing it in mid-section and pulling it with his other hand that does not hold the twin master cylinder 129, he transmits a mechanical signal through the twin tube 156 to the twin connector. In response, the twin connector 164 slides in a plastic grommet 169 (which isolates electrically the twin connector 164 from the bracket 146), overcoming a resistance of a pre-loaded spring 170, and the twin connector's lip 171 contacts the bracket 146. This shortens electrically a spark-plug 172 through a wire 173 and shuts-off the engine 155 since the twin connector 164 and the bracket 146 are made of electrically conductive metal.

A second embodiment of the invention, shown in FIG. 3, controls a skateboard driven by an electric motor 172 and a rechargeable battery 173. (It should be noted that similar parts will be identified with same numerals throughout the various FIGS.)

It can be seen that the lower portion of the hand held master unit 174 contains a hydraulic master cylinder 140, which effects the braking of the wheels 120 by actuating a slave cylinder 160, through a coiled hydraulic tube 175, as in FIG. 2. The upper portion of the master unit contains a trigger-piston 176 to which a sliding contact 177 is attached, for slidingly contacting resistances 178 and 179 and gradually decreasing the resistance between electrically isolated wires 180 and 181. Normally, the trigger-piston is urged leftwards by a spring 187 against a stop-sleeve 186.

The motor 172 is connected to the battery 173 through a wire 182, and through the wire 180, the resistance 178, the sliding contact 177, the resistance 179 and the wire 181, in series, and by depressing the trigger-piston and decreasing the electrical resistance between the wires 180 and 181, the propelling power of the motor 172 is increased. Thus, the electric signal to accelerate the skateboard 110 is transmitted in this embodiment through the electric wires 180 and 181, which run through the body of the master unit 183, through a barbed fitting 184, in and along the tube 175, and exit the hydraulic system through the body of a connector 185 which is mounted to the running gear of the skateboard on a bracket 186. Alternatively, the wires 180 and 181 can be molded into the side wall of the tube 175, or guided in the center of the coil that the tube forms, but in all these cases the wires are made to run along the tube so that the skater does not have to deal with more than one assembly connecting his hand to the running gear of the skateboard. It can be seen that the electric control circuitry used here is a very simple one, and improved circuitry which is more efficient in utilizing the battery's energy can be substituted.

While the present invention has been illustrated by a limited number of embodiments it is understood that various modifications and substitutions can be made without departing from the spirit of the invention or the scope of the claims.

I claim:

1. In a skateboard type device, a hand operated control system for transmitting a signal from a user's hand to a running gear of said device, comprising in combination;
    a. a hydraulic master cylinder having an output port, for displacing fluid through said output port in response to a mechanical signal from a user's hand,
    b. a hydraulic slave cylinder connected to said running gear, having an input port for receiving said fluid and translating it to a mechanical signal for effecting said running gear, and
    c. a resilient helically coiled self-storing tube assembly connecting said input and output ports while allowing said master cylinder to be freely moved relative to said slave cylinder without interfering with said signal.

2. A control system as in claim 1, wherein said cylinders incorporate a rolling diaphragm mechanism to define an expandable chamber therein.

3. A control system as in claim 1, wherein said tube is made of polyurethane material.

4. A control system as in claim 1, wherein an additional mechanical signal is transmitted through said tube.

5. A control system as in claim 4, wherein said mechanical signal is transmitted to a switch which is adapted to shut off an engine.

6. A control system as in claim 1, wherein an additional electrical signal is transmitted by a wire running along said tube.

7. A control system as in claim 1, wherein said signal effects the acceleration of said device.

8. A control system as in claim 1, wherein said signal effects the braking of said device.

* * * * *